US012743665B2

(12) United States Patent
Wray et al.

(10) Patent No.: US 12,743,665 B2
(45) Date of Patent: Sep. 22, 2026

(54) ANALYZING PERFORMANCE OF MODELS TRAINED WITH VARYING CONSTRAINTS

(71) Applicant: Aible Inc., Pleasanton, CA (US)

(72) Inventors: Jonathan Richard Wray, Danville, CA (US); Arijit Sengupta, San Carlos, CA (US); Rodney Butters, Larkspur, CA (US); James Zalman, Danville, CA (US)

(73) Assignee: Aible Inc., Pleasanton, CA (US)

( * ) Notice: Subject to any disclaimer, the term of this patent is extended or adjusted under 35 U.S.C. 154(b) by 615 days.

(21) Appl. No.: 17/813,090

(22) Filed: Jul. 18, 2022

(65) Prior Publication Data

US 2022/0358416 A1 Nov. 10, 2022

Related U.S. Application Data

(62) Division of application No. 16/512,647, filed on Jul. 16, 2019.

(51) Int. Cl.

*G06N 20/20* (2019.01)
*G06N 20/00* (2019.01)
*G06F 3/00* (2006.01)

(52) U.S. Cl.

CPC ............... *G06N 20/20* (2019.01); *G06F 3/00* (2013.01); *G06N 20/00* (2019.01)

(58) Field of Classification Search

CPC ........... G06N 20/00; G06N 20/20; G06F 3/00
See application file for complete search history.

(56) References Cited

U.S. PATENT DOCUMENTS

| | | | | |
|---|---|---|---|---|
| 7,408,551 | B1 | 8/2008 | Kazmer et al. | |
| 8,306,940 | B2 | 11/2012 | Lee et al. | |
| 9,684,865 | B1 | 6/2017 | Ezick et al. | |
| 10,572,877 | B2 | 2/2020 | Aquino et al. | |
| 10,586,171 | B2 | 3/2020 | Hackett | |
| 2003/0088492 | A1 | 5/2003 | Damschroder | |
| 2010/0241596 | A1* | 9/2010 | Lee | G06N 5/04 706/46 |
| 2014/0279794 | A1* | 9/2014 | Aliferis | G06N 20/00 706/46 |
| 2017/0364831 | A1 | 12/2017 | Ghosh et al. | |
| 2019/0156178 | A1* | 5/2019 | Thornton | G06N 3/044 |

(Continued)

OTHER PUBLICATIONS

Provost et al., Robust Classification for Imprecise Environments, Machine Learning 42, Kluwer Academic Publishers 2001, pp. 203-231 (Year: 2001).*

(Continued)

*Primary Examiner* — Daniel T Pellett
(74) *Attorney, Agent, or Firm* — Mintz Levin Cohn Ferris Glovsky and Popeo, P.C.

(57) ABSTRACT

Data characterizing a set of models trained on a dataset using a set of resourcing levels can be received. The set of resourcing levels can specify a condition on outputs of models in the set of models. Performance of the set of models can be assessed using the set of resourcing levels. A feasible performance region can be determined using the assessment. The feasible performance region can associate each constraint in the set of resourcing levels with a model in the set of models. The feasible performance region can be displayed. Related apparatus, systems, articles, and techniques are also described.

15 Claims, 4 Drawing Sheets

(56) References Cited

U.S. PATENT DOCUMENTS

| | | | |
|---|---|---|---|
| 2019/0258904 A1* | 8/2019 | Ma | G06F 18/24133 |
| 2019/0294999 A1 | 9/2019 | Guttmann | |
| 2019/0378034 A1 | 12/2019 | Mowrer et al. | |
| 2020/0160196 A1 | 5/2020 | Ramakrishnan et al. | |
| 2021/0019662 A1 | 1/2021 | Wray et al. | |

OTHER PUBLICATIONS

Shmueli, Galit, Lift Up and Act! Classifier Performance in Resource-Constrained Applications, arXiv:1906.03374v2, Jun. 20, 2019, 13 pages (Year: 2019).*
(Feb. 23, 2015) Confusion Matrix—Model Building and Validation, Udacity, 2 pages.
Gad et al. (2020) "Evaluating Deep Learning Models: The Confusion Matrix, Accuracy, Precision, and Recall", Paperspace Blog, 19 pages.
Gupta, Mehul (Apr. 21, 2020) "Calculating Precision & Recall for Multi-Class Classification", Data Science in your pocket, 9 pages.
(Retrieved on Jun. 8, 2023) How Do You Calculate Precision and Recall for Multiclass Classification Using Confusion Matrix, Cross Validated, 6 pages.
Sherpa, Dorjey (Mar. 15, 2021) "Introduction to Univariate, Bivariate and Multivariate Analysis", Analytics Vidhya, 5 pages.
Shmueli, Boaz (Jul. 2, 2019) "Multi-Class Metrics Made Simple, Part I: Precision and Recall", Towards Data Science, 8 pages.
Liang Zhu, (2022) https://www.linkedin.com/in/zhu1liang4, 7 pages.
(2022) PTHG 2021 Invited Talk An Overview of Machine Learning Techniques in Constraint Solving, https://www.youtube.com/watch?v=WelzkleeozY, 15 pages.
(2022) Simplilearn, https://www.youtube.com/watch?v=prWyZhcktn4&t=38s, 34 pages.
(2022) Stanford, https://www.youtube.com/watch?v=-104fPOOrxk, 13 pages.
(2021) Stanford, Constraint Satisfaction Problems 2—Definitions I Stanford CS221: AI, https://www.youtube.com/watch?v=uj5wCcHsSIA, 16 pages.
Ghosh et al. (2018) "Model, Data and Reward Repair: Trusted Machine Learning for Markov Decision Processes", IEEE, 6 pages.
Popescu et al. (2021) "An overview of machine learning techniques in constraint solving", Journal of Intelligent Information Systems, 28 pages.
Tao et al. (2016) "Harvesting Design Knowledge From the Internet: High-Dimensional Performance Tradeoff Modeling for Large-Scale Analog Circuits", IEEE, 14 pages.

* cited by examiner

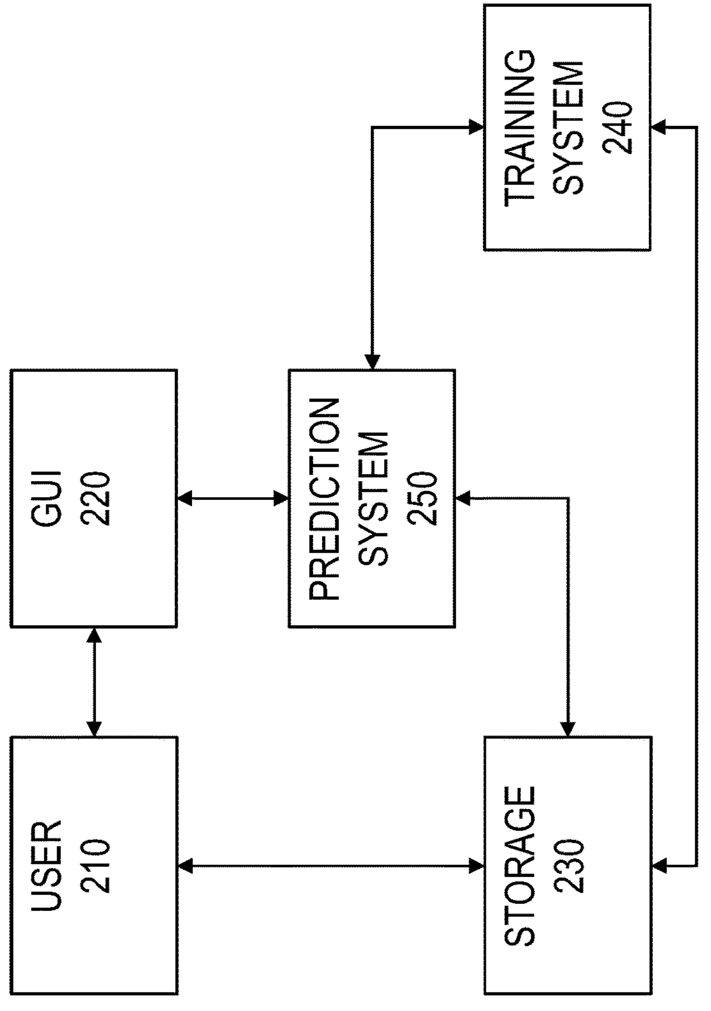
FIG. 2
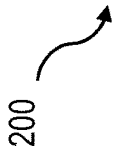

ANALYZING PERFORMANCE OF MODELS TRAINED WITH VARYING CONSTRAINTS

CROSS REFERENCE TO RELATED APPLICATION

This Application is a division of and claims priority under 35 U.S.C. § 120 to U.S. patent application Ser. No. 16/512,647 filed on Jul. 16, 2019, the entire contents of which are incorporated by reference herein.

TECHNICAL FIELD

The subject matter described herein relates to analyzing the performance of learning models trained with varying constraints.

BACKGROUND

In predictive analytics, accuracy may not be a reliable metric for characterizing the performance of a predictive model. This is because accuracy can yield misleading results, particularly to a non-expert business user and particularly where the dataset is unbalanced or the cost of error of false negatives and false positives is mismatched. An unbalanced dataset can include a dataset where the number of observations in different classes vary. For example, if there were 95 cats and only 5 dogs in the data, a particular predictive model (e.g., classifier) might classify all of the observations as cats. The overall accuracy of the predictive model would be 95%, but the model would have a 100% recognition rate (e.g., true positive rate, sensitivity) for the cat class but a 0% recognition rate for the dog class.

SUMMARY

In an aspect, data characterizing a set of models trained on a dataset using a set of resourcing levels can be received. The set of resourcing levels can specify a condition on outputs of models in the set of models. Performance of the set of models can be assessed using the set of resourcing levels. A feasible performance region can be determined using the assessment. The feasible performance region can associate each resourcing level in the set of resourcing levels with a model in the set of models. The feasible performance region can be displayed.

One or more of the following features can be included in any feasible combination. For example, data characterizing a dataset, an optimization function, and a set of constraints can be received. The set of constraints can specify a condition on outputs of models in a set of models. A set of models can be trained using the optimization function and the set of constraints. The set of models can be provided. Each constraint in the set of constraints can be associated with at least one model in the set of models.

User input specifying the condition on the variable, a value of a positive, a value of a negative, training data, and a training goal can be received. The value of the positive can include a value of true positive and a value of false positive. The value of negative can include a value of true negative and a value of false negative. Respective models in the set of models can be trained using the training data, the training goal, and the condition on the variable. The respective models in the set of models can be associated with respective resourcing levels in the set of resourcing levels specifying the condition on the outputs of the models in the set of models. A set of optimization functions can be determined using the set of models. Each optimization function in the set of optimization functions can be associated with respective resourcing levels in the set of resourcing levels specifying the condition on the outputs of the models in the set of models.

An ensemble model can be generated using the feasible performance region. The ensemble model can select the model associated with a first resourcing level in the set of resourcing levels in response to receiving the first resourcing level. The ensemble model can be provided. Data characterizing the first resourcing level can be received. The model associated with the first resourcing level in the set of resourcing levels can be selected by the ensemble model and in response to receiving the first resourcing level. A prediction can be performed using the model associated with the first resourcing level. An output of the prediction performed by the model associated with the first resourcing level can be provided.

A set of optimization functions can be determined using the set of resourcing levels specifying the condition on the outputs of the models in the set of models. The set of models can be generated using the set of optimization functions. Each optimization function in the set of optimization functions can characterize respective metrics for evaluating the performance of the set of models. The assessing can further include evaluating, using the set of optimization functions, respective outputs provided by respective models in the set of models. Assessing the performance of the set of models can include determining at least one of precision, recall, accuracy, and optimization function of each model in the set of models. The model associated with a respective resourcing level can be an optimally performing model for the respective resourcing level with respect to the at least one of precision, recall, accuracy, and optimization function.

Determining the feasible performance region can include bounding every model in the set of models leading to an optimal point in a range of possible resourcing levels. The range of possible resourcing levels can include every resourcing level between a first resourcing level and a second resourcing level. The second resourcing level can be different from the first resourcing level. Determining the feasible performance region can further include interpolating a set of possible resourcing levels between consecutive resourcing levels in the set of resourcing levels. At least one of a region and a border can be defined, using the set of possible resourcing levels. A respective possible resourcing level in the set of possible resourcing levels can be associated with the model in the set of models that is associated with at least one of the consecutive resourcing levels. User input specifying a new resourcing level value can be received after displaying the feasible performance region. At least one new model can be generated based on the new resourcing level value. A new optimization function value can be computed using the new resourcing level value. At least one new model can be trained using the new optimization function value.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a system block diagram illustrating an example system enabling the training, assessing, and deployment of models trained under different constraints;

Like reference symbols in the various drawings indicate like elements.

DETAILED DESCRIPTION

Figure 1:
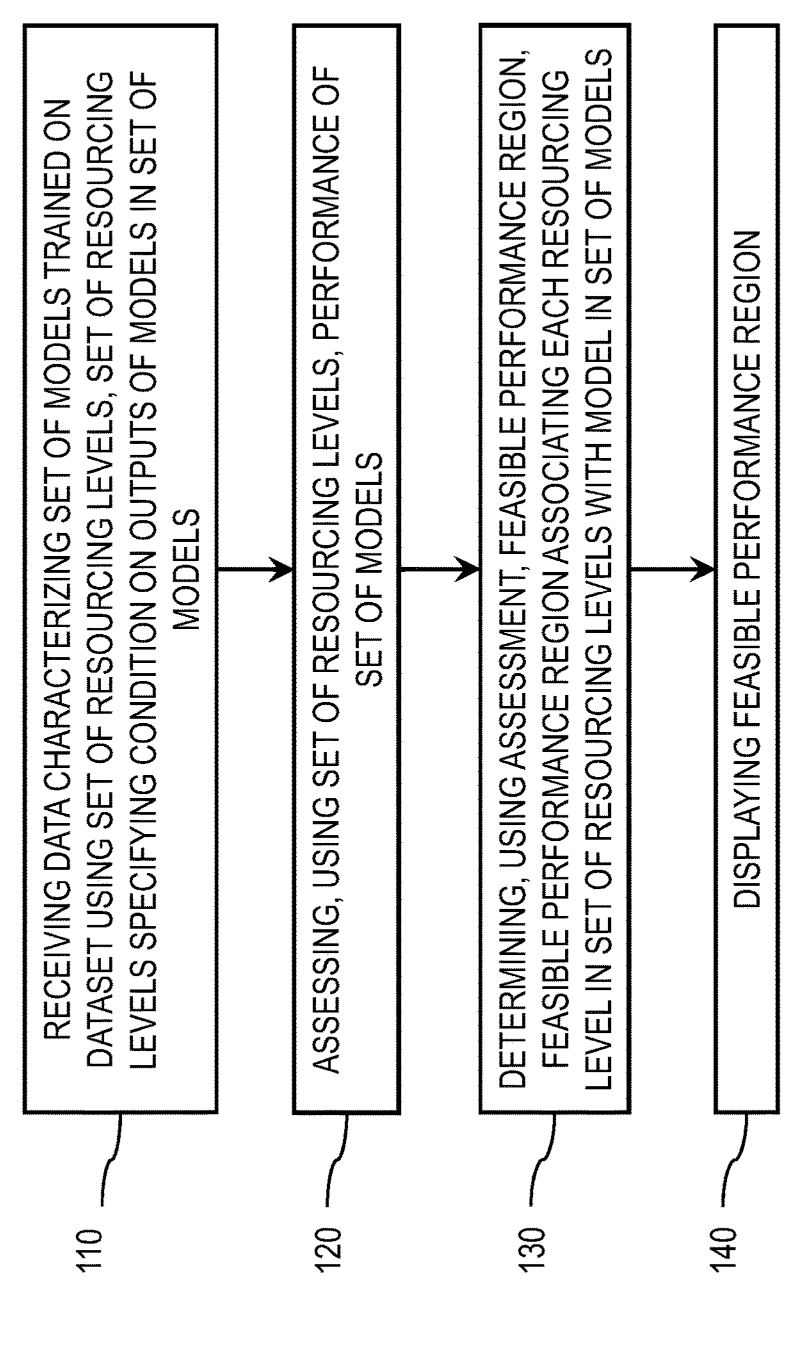
FIG. 1 is a process flow diagram illustrating an example process enabling the assessment of the performance of multiple models trained under different constraints.

Typically, a model can be provided by a data scientist to perform specific predictions on a specific dataset. The data scientist can train the model for a specific predictive task, assess and fine-tune the performance of the model with respect to the specific predictive task, and deploy the model. But training, assessing, and deploying a specialized model by a subject matter expert can be cumbersome and expensive, especially when the model is utilized for a different predictive task. As such, it can be desirable to train, assess, and deploy multiple models.

In some cases, the models can be trained, assessed, and deployed with the assumption that one or more parameter in the input data, such as capacity, is unconstrained. For example, the models can be trained assuming unlimited capacity. Likewise, assessing the performance of the models (e.g., evaluating the quality of predictions made by the models) can assume that the input data is unconstrained. But models can be deployed to perform predictions on input data with parameters including operational constraints. And because the models were trained and assessed assuming unconstrained input parameters, deploying the models on constrained input parameters can negatively affect the performance of the models. Accordingly, it can be desirable to train and assess the models assuming multiple different constraints on the input parameters.

Some implementations of the current subject matter can train and assess multiple models with multiple different constraints on the input parameters. And the multiple models can be treated as a single model. For example, each model can be trained with each of the different constraints on a given input parameter and the performance of each model can be assessed under each of the different constraints. The assessment of the performance of the models can be provided in a visualization illustrating a feasible performance region of the models. For example, the feasible performance region can include a boundary representing, for the set of models trained under the different constraints, predictions as a function of the given constrained parameter and an indication of the model that produced a given prediction. Given a constraint, the model most appropriate for the given constraint can be selected and deployed to perform predictions under the given constraint.

Accordingly, some implementations of the current subject matter can provide improved predictions by training and assessing multiple models under different constraints and providing an intuitive representation of the models and their performance under the different constraints. By training and assessing multiple models under different constraints and providing an intuitive representation of the performance of the models under the different constraints, the model most appropriate for a given operational constraint can be selected and deployed. As such, some implementations of the current subject matter can efficiently train, assess, and deploy models. By efficiently training, assessing, and deploying models, some implementations of the current subject matter can provide more appropriate predictions and can save computational resources, production time, and production costs.

FIG. 1 is a process flow diagram 100 illustrating an example implementation of assessing the performance of multiple models under multiple different constraints and providing an intuitive representation of the of the performance of the models under the different constraints. By assessing multiple models under multiple different constraints and providing an intuitive representation of the performance of the models under the different constraints, the model most appropriate for a given operational constraint can be selected and deployed. As such, the performance of the models can be improved and computational resources, production time, and production costs can be saved.

At 110, data characterizing a set of models, $M=\{M_1, \ldots, M_k\}$ (where $M_i \in M$ is a model), trained using a set of resourcing levels (e.g., constraints and/or the like), $C=\{c_1, \ldots, c_p\}$ (where $c_i \in C$ is a constraint) can be received. In some cases, the set of models can be represented as an ensemble model. An ensemble model can be allow for interaction with the set of models by interacting with the ensemble model. For example, providing an input data entry $x^{(j)}$ from a dataset $D_n$, $=\{x^{(1)}, \ldots, x^{(n)}\}$, where n is the number of variables (e.g., columns and/or the like) associated with respective entries in the dataset and $j=1, \ldots, n$, to an ensemble model M including a set of models $\{M_1, \ldots, M_k\}$ can be the equivalent of providing the data entry as input to each model in the set of models (e.g., $M(x^{(j)})=\{M_1(x^{(j)}), \ldots, M_k(x^{(j)})\}$). The set of constraints can specify a condition on a variable of the models. Each model (e.g., submodel and/or the like) in the set of models (e.g., ensemble model) can be trained using at least one constraint in the set of constraints. For example, the specified condition on the variable of the model can limit the space of possible solutions provided by the set of models. For example, for a given input $$x^{(j)} = \left(x_1^{(j)}, \ldots, x_d^{(j)}\right), \text{ where } x^{(j)} \in R^d$$

is a d-dimensional vector, each model can provide an output, such as a classification, $$M_i(x^{(j)}) = y_i^{(j)} \text{ where } y_i^{(j)} \in \{\text{positive, negative}\}$$

corresponds to a "positive" (e.g., a classification as a positive class) or a "negative" (e.g., a classification as a negative class)). As will be discussed in detail below, a constraint can, for example, constrain a value of a variable in an entry of a dataset used to train the set of models.

In some cases, the output can specify what is being tested for, such as an input in a medical classifier being classified in the positive class as a tumor or the negative class as not a tumor or an input to an email classifier being classified in the positive class as a spam email or the negative class as not a spam email. In some cases, the specified constraint can limit the number of "positive" classifications output by a model, the number of "negative" classifications output by a model, and/or the like. For example, if the variable includes capacity and the constraint specifies a condition on capacity, such as a maximum possible capacity, the aggregate number of "positive" classes provided by each model can be below the capacity constraint. For example, in a hospital admissions classifier (e.g., model and/or the like), the constraint can include the number of beds available to patients in the hospital, where a single patient can occupy a bed. The variable can include the number of currently admitted patients and a new patient can be classified in the positive class, to be admitted, or in the negative class, not to be admitted. But based on the constraint on the variable, the number of admitted patients cannot exceed the number of hospital beds. If, for example, the number of patients equals the number of hospital beds, currently admitted lower risk patients can be released early to free up beds for new patients with a risk greater than the lower risk patients.

At 120, the performance of the set of models can be assessed. For example, each class provided by a classifier can include an indication of whether the classification was a true classification (e.g., a true positive TP, a true negative TN, and/or the like) or a false classification (e.g., a false positive FP, a false negative FN, and/or the like). Each classification (e.g., true classification, false classification, and/or the like) can be associated with a value. For example, a "true positive" can be associated with a value $TP_v$, a "true negative" can be associated with a value $TN_v$, a "false positive" can be associated with a value $FP_v$, and a "false negative" can be associated with a value $FN_v$. When given a set of inputs, the set of models can provide a classification for each input. For example, given a set of inputs $\{x^{(1)}, \ldots, x^n\}$ and an ensemble model (e.g., a set of constrained models and/or the like) $M=\{M_1, \ldots, M_k\}$, each constrained model $M_i$ can provide a set of predictions $$Y_i = \{y_i^{(1)}, \ldots, y_i^{(n)}\}$$

such that the set of constrained models M provides a set of sets of predictions, $M(\{x^{(1)}, \ldots, x^{(n)}\})=\{M_1(\{x^{(1)}, \ldots, x^{(n)}\}), \ldots, M_k(\{x^{(1)}, \ldots, x^{(n)}\})\}=\{Y_1, \ldots, Y_k\}=\{\{y_1^{(1)}, \ldots, y_1^{(n)}\}, \ldots, \{y_k^{(1)}, \ldots, y_k^{(n)}\}\}$. For example, as discussed above, each prediction $$y_i^{(j)}$$

can include an indication whether the input $x^{(j)}$ was correctly classified by model $M_i$ (e.g., a "true") or incorrectly classified by model $M_i$ (e.g., a "false"). The predictions can be aggregated over $i \in \{1, \ldots, k\}$ and $j \in \{1, \ldots, n\}$. The aggregated predictions can include, for example, a count of "true positives" $TP_c$, a count of "true negatives" $TN_c$, a count of "false positives" $FP_c$, and a count of "false negatives" $FN_c$. For example, a constraint can provide a condition on one or more of $TP_c$, $TN_c$, $FP_c$, $FN_c$, and/or the like.

In some cases, the frequency with which a model was correct when predicting the "positive" class, or precision $$\left(\text{e.g., Precision} = \frac{TP_c}{TP_c + FP_c\,|}\right),$$

can be used to assess the performance of the model. In some cases, the number of "positive" labels correctly identified by the model, or recall $$\left(\text{e.g., Recall} = \frac{TP_c}{TP_c + FN_c}\right),$$

can be used to assess the performance of the model. In some cases, the fraction of predictions that the model correctly predicted, or accuracy $$\left(\text{e.g., Accuracy} = \frac{TP_c + TN_c}{TP_c + TN_c + FP_c + FN_c}\right),$$

can be used to assess the performance of the model. But, assessing the performance of a model by optimizing on these metrics may not necessarily provide the best model for a given set of constraints. For example, in some cases, it can be desirable to assess the performance of the models by determining functions such as impact (e.g., $\text{Impact}=TP_c \cdot TP_v + TN_c \cdot TN_v + FP_c \cdot FP_v + FP_c \cdot FP_v$). In some cases, impact can include the aggregation over classifications of the count of classifications weighted by the value of respective classifications. In some cases, custom training and evaluation functions or metrics other than precision, recall, accuracy, loss, and/or impact can be used, including, for example, custom optimization functions. In some cases, a set of custom optimization functions can be used to generate the set of models. In some cases, a set of custom optimization functions can be used to assess the performance of the set of models by evaluating, for a given input data entry and/or set of constraints specifying a condition on a variable of the input data entry, respective outputs provided by the sets of models.

Further to the boolean case described above (e.g., model $M_i$ outputting either "positive" or "negative" for a given input), some implementations of the current subject matter can include multivariate models $M_i$, such that the output of the model includes three or more possible output values. For example, given a model $M_i$, an input $x^{(j)}$, where $x^{(j)}$ can include an element of the dataset $D_n$, and an output dimension $d_o$, where $d_o \geq 3$, the model can output $$M_i(x^{(j)}) = y_i^{(j)}, \text{ where } y_i^{(j)} \in \{\text{class}_1, \ldots, \text{class}_{d_0}\}.$$

For example, if $d_o=3$, then the output $$y_i^{(j)}$$

can include either $class_1$, $class_2$, or $class_3$. Then, the performance of each model $M_i \in M$ can be provided in a confusion matrix characterizing, for each possible output, a value of a respective output given a respective actual value. For example, when the output of model $M_i$ on input $x^{(j)}$ is $$y_i^{(j)}(\text{e.g., } M_i(x^{(j)}) = y_i^{(j)}),$$

the output can be compared with the actual value being predicted and the value $v_{st} \in R$ (e.g., $v_{st}$ can include a real number and/or the like) can be provided, where s can include the predicted class and t can include the actual (e.g., true and/or the like) value.

As illustrated in the confusion matrix below, the output $$y_i^{(j)}$$

of model $M_i$ on input $x^{(j)}$ can include $class_1$, $class_2$, or $class_3$. The actual value can include $class_1$, $class_2$, or $class_3$. When the output $$y_i^{(j)}$$

of model $M_i$ on input $x^{(j)}$ is $class_1$, the confusion matrix can include three different values characterizing the performance of the model. For example, when the output $$y_i^{(j)} = \text{class}_1$$

and the actual value is $class_1$ a value of $v_{11}$ can be obtained; when the output $$y_i^{(j)} = \text{class}_1$$

and the actual value is $class_2$ a value of $v_{12}$ can be obtained; and when the output $$y_i^{(j)} = \text{class}_1$$

and the actual value is $class_3$ a value of $v_{13}$ can be obtained.

| confusion matrix | | | | |
|---|---|---|---|---|
| | | actual | | |
| | | $class_1$ | $class_2$ | $class_3$ |
| $y_i^{(j)}$ | $class_1$ | $v_{11}$ | $v_{12}$ | $v_{13}$ |
| | $class_2$ | $v_{21}$ | $v_{22}$ | $v_{23}$ |
| | $class_3$ | $v_{31}$ | $v_{32}$ | $v_{33}$ |

To illustrate this example further, suppose the three classes are "red", "yellow", and "green", corresponding to a stoplight, and the problem includes predicting the color of the light by a self-driving car. Then $class_1$ can correspond to "red", $class_2$ can correspond to "yellow", and $class_3$ can correspond to "green". When a given model $M_i$ predicts the color of the stoplight as "red", the possible actual values can include "red", "yellow", and "green", and the confusion matrix can include a characterization of the performance of the model. For example, if the actual value is "red", then $v_{red,red}$ can be characterized as performing well. When the actual value is "yellow", then $v_{red,yellow}$ can be less than $v_{red,red}$, but not as low as $v_{red,green}$ when the actual value is "green", since a car stopping at a yellow light can be expected under ordinary driving conditions (e.g., the car being driven by a human), but a car stopping at a green light can be out of the ordinary. Similarly, a value characterizing the performance of the prediction can be provided for each pair of outputted class and respective actual value.

At 130, the feasible performance region can be determined using the assessment of the performance of the set of models ascertained at 120. For example, as described above, the performance of each model can be assessed. The assessment of performance can be used to determine which model $M_i$ can be used for different values of the constrained variable $$x_h^{(j)},\ x^{(j)} = (x_i^{(j)}, \ldots, x_h^{(j)}, \ldots, x_d^{(j)}).$$

For example, model $M_1$ may provide optimal performance for a value of the constrained variable $$x_h^{(j)}$$

less than a first threshold $T_1$, model $M_2$ may provide optimal performance for a value of the constrained variable $$x_h^{(j)}$$

greater than the first threshold $T_1$ but less than a second threshold $T_2$, and model $M_3$ may provide optimal performance for a value of the constrained variable $$x_h^{(j)}$$

greater than the second threshold $T_2$. In some cases, the feasible performance region can be determined by interpolating between the accuracy of the generated models to define a region, border, and/or the like. For example, a metric (e.g., accuracy, recall, precision, impact, and/or the like) can be determined for each model in the generated set of models. The respective metrics can be discrete elements (e.g., points and/or the like) of the constraint space (e.g., the number line representing the constraint and/or the like). The respective discrete elements can be used to interpolate, for example, a continuous boundary and/or region. In some cases, the feasible performance region can be determined by bounding the optimal points in a range of possible constraint values for respective (e.g., every) model in the set of models.

At 140, the feasible performance region of the set of models as a function of the resourcing level can be displayed. As will be discussed below, the displayed feasible performance region can include a visualization of, for example, the model $M_i$ that provides optimal performance in a given interval of the resourcing variable, the value of the custom training and evaluation function or metric that is optimized by the model $M_i$, and/or the like.

FIG. 2 is a system block diagram illustrating an example implementation of a system 200 for training, assessing, and deploying a set of resourcing models. System 200 can include graphical user interface (GUI) 220, storage 230, training system 240, and prediction system 250. By training and assessing multiple models under different resourcing levels and providing an intuitive representation of the performance of the models under the different resource constraints, the model most appropriate for a given operational constraint can be selected and deployed. As such, the performance of the models can be improved and computational resources, production time, and production costs can be saved.

GUI 220 can be configured to receive input from user 210. For example, the input can include a dataset $D_n=\{x^{(1)}, \ldots, x^{(n)}\}$ for training the set of models $M=\{M_1, \ldots, M_k\}$, where k is the number of models in the set of models. As another example, the input can include values $TP_v$, $TN_v$, $FP_v$, $FN_v$; counts $TP_c$, $TN_c$, $FP_c$, $FN_c$; and/or the like. As another example, the input can include constraints (e.g., a condition on a variable and/or the like)

$$c_{h,r}^{(j)}$$

on variables $$x_h^{(j)}$$

(e.g., columns and/or the like) of elements $x^{(j)}$ (e.g., rows and/or the like) of the dataset $D_n$, where, for example, $$x_h^{(j)} \in x^{(j)} = \left(x_1^{(j)}, \ldots, x_h^{(j)}, \ldots, x_d^{(j)}\right),$$

$x^{(i)} \in D_n$, where n is the number of entries (e.g., rows and/or the like) in the dataset, d is the dimension (e.g., number of columns and/or the like) of each dataset entry, j is an index indicating a value in the range $\{1, \ldots, n\}$ (e.g., an index pointing to a dataset entry and/or the like), h is an index indicating a value in the range $\{1, \ldots, d\}$ (e.g., an index pointing to a variable of a dataset entry and/or the like), and r is an index indicating a value in the range $$\left\{1, \ldots, \text{number of constraints on the variable } x_h^{(j)}\right\}$$

(e.g., an index pointing to a constraint in the set of constraints on a variable and/or the like.

As another example, GUI 220 can be configured to receive user input specifying a training goal. For example, a training goal can include an indication of the output, performance, and/or the like of the set of models. For example, a set of models can be trained to optimize a first goal, such as optimizing impact; optimize a first goal given a second goal, such as optimizing growth given break even impact, optimize cash flow given minimum investment, and/or the like. In some implementations, the boundary of feasible performance can determine all possible optimal points for $M=\{M_1, \ldots, M_k\}$.

Storage 230 can be configured to store (e.g., persist and/or the like), for example, inputs received from GUI 220 such as datasets $D_n=\{x^{(1)}, \ldots, x^{(n)}\}$; values $TP_v$, $TN_v$, $FP_v$, $FN_v$; counts $TP_c$, $TN_c$, $FP_c$, $FN_c$; constraints $$c_{h,r}^{(j)}$$

on variables $$x_h^{(j)};$$

and/or the like. As will be discussed below, storage 230 can be configured to store sets of trained models. And storage 230 can be configured to store, for example, the performance of the sets of models, assessments of the performance of the sets of models, and/or the like. Storage 230 can include, for example, repositories of data collected from one or more data sources, such as relational databases, non-relational databases, data warehouses, cloud databases, distributed databases, document stores, graph databases, operational databases, and/or the like.

Training system 240 can be configured to train sets of models $M=\{M_1, \ldots, M_k\}$ on datasets, such as $D_n=\{x^{(1)}, \ldots, x^{(n)}\}$ Each model $M_i \in M$ can be trained on the entries $x^{(j)}$ in the dataset $D_n$ using, for example, learning algorithms, such as principal component analysis, singular value decomposition, least squares and polynomial fitting, k-means clustering, logistic regression, support vector machines, neural networks, conditional random fields, decision trees, and/or the like. In some cases, the sets of models can be trained on constrained variables $$x_h^{(j)} \in x^{(j)},$$

where $x^{(j)} \in D_n$ and the constraint includes $$c_{h,r}^{(j)}.$$

In some cases, user input can be received specifying a new constraint value $$c_{h,r+1}^{(j)}$$

and a new model $M_{k+1}$ can be generated. For example, the new model $M_{k+1}$ can be trained on the new constraint $$c_{h,r+1}^{(j)}.$$

Prediction system 250 can be configured to assess the performance of sets of models, such as $M=\{M_1, \ldots, M_k\}$, and determine feasible performance regions. As will be discussed below with reference to FIG. 3 and FIG. 4, the feasible performance region can include a set of intervals $I=\{(a_1, a_2), \ldots, (a_{p-1}, a_p)\}$, where for a given interval $(a_i, a_{i+1}) \in I$, $a_i \in \{a_1, \ldots a_{p-1}\}$ can include the start values of the intervals and $a_{i+1} \in \{a_2, \ldots, a_p\}$ can include the end values of the intervals, such that for each interval $(a_i, a_{i+1}) \in I$, a model $M_{(a_i,a_{i+1})} \in M$ can provide optimal performance in the given interval $(a_i, a_{i+1})$. The optimally performing model $M_{(a_i,a_{i+1})}$, for example, can be associated with and used for values of the variable within the interval (e.g., $$x_h^{(j)} \in (a_i, a_{i+1})$$

and/or the like).

Following the above example, for each data set entry $x^{(j)} \in D_n$, and for each value of a variable in each dataset entry (e.g., $$x_h^{(j)} \in x^{(j)}$$

such that $$a_1 \le x_h^{(j)} \le a_p,$$

the performance of each model $M_l \in M$ can be assessed by determining the output of each model $M_l$ when given the variable $$x_h^{(j)},$$

(e.g., $$M_l\left(x_h^{(j)}\right)$$

can be computed and/or the like). In some cases, the output of the model can include impact. After computing the output of each model $M_l \in M$ over the values of the variable $$x_h^{(j)}$$

in each interval $(a_i, a_{i+1}) \in I$, the feasible performance region can include the set of intervals $I=\{(a_1, a_2), \ldots, (a_{p-1}, a_p)\}$ and, for each interval $(a_i, a_{i+1})$, the associated model $M_{(a_i,a_{i+1})}=M_l$ such that $M_l$ can include the optimally performing model in the interval $(a_i, a_{i+1})$. For example, the feasible performance region can include a map of intervals $(a_i, a_{i+1})$ to models $M_{(a_i,a_{i+1})}$, such that Feasible Performance Region$=\{(a_1, a_2)\colon M_{(a_1,a_2)}, \ldots, (a_{p-1}, a_p)\colon M_{(a_{p-1},a_p)}\}$.

Figure 3:
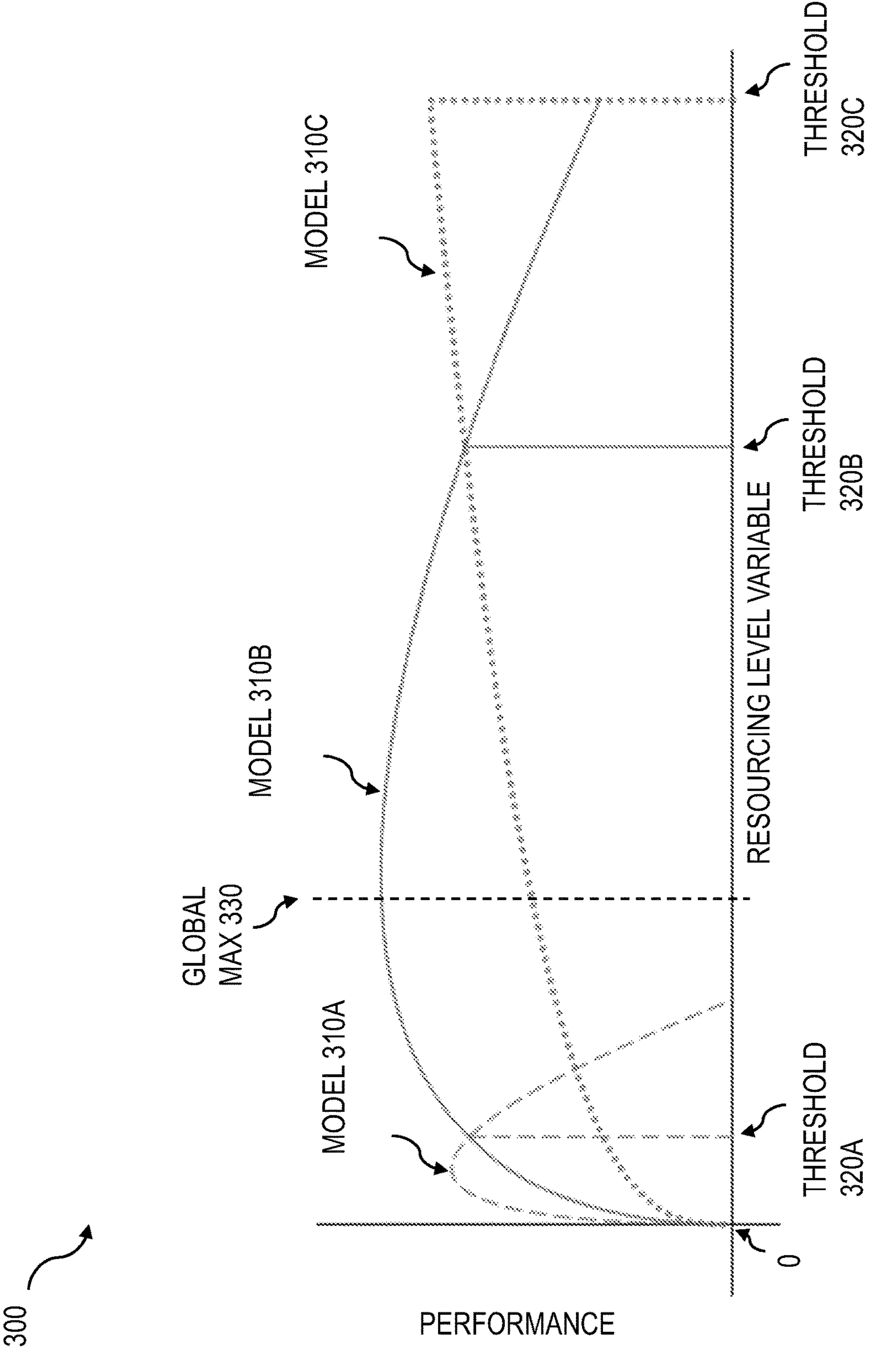
FIG. 3 is a diagram illustrating an example visualization of predictions provided by several models as a function of a constrained parameter.

FIG. 3 is a diagram illustrating an example visualization 300 of outputs provided by several models as a function of a resourcing variable. By training and assessing multiple models under different resourcing levels and providing an intuitive representation of the performance of the models under the different constraints, the model most appropriate for a given operational constraint can be selected and deployed. As such, the performance of the models can be improved and computational resources, production time, and production costs can be saved.

Figure 4:
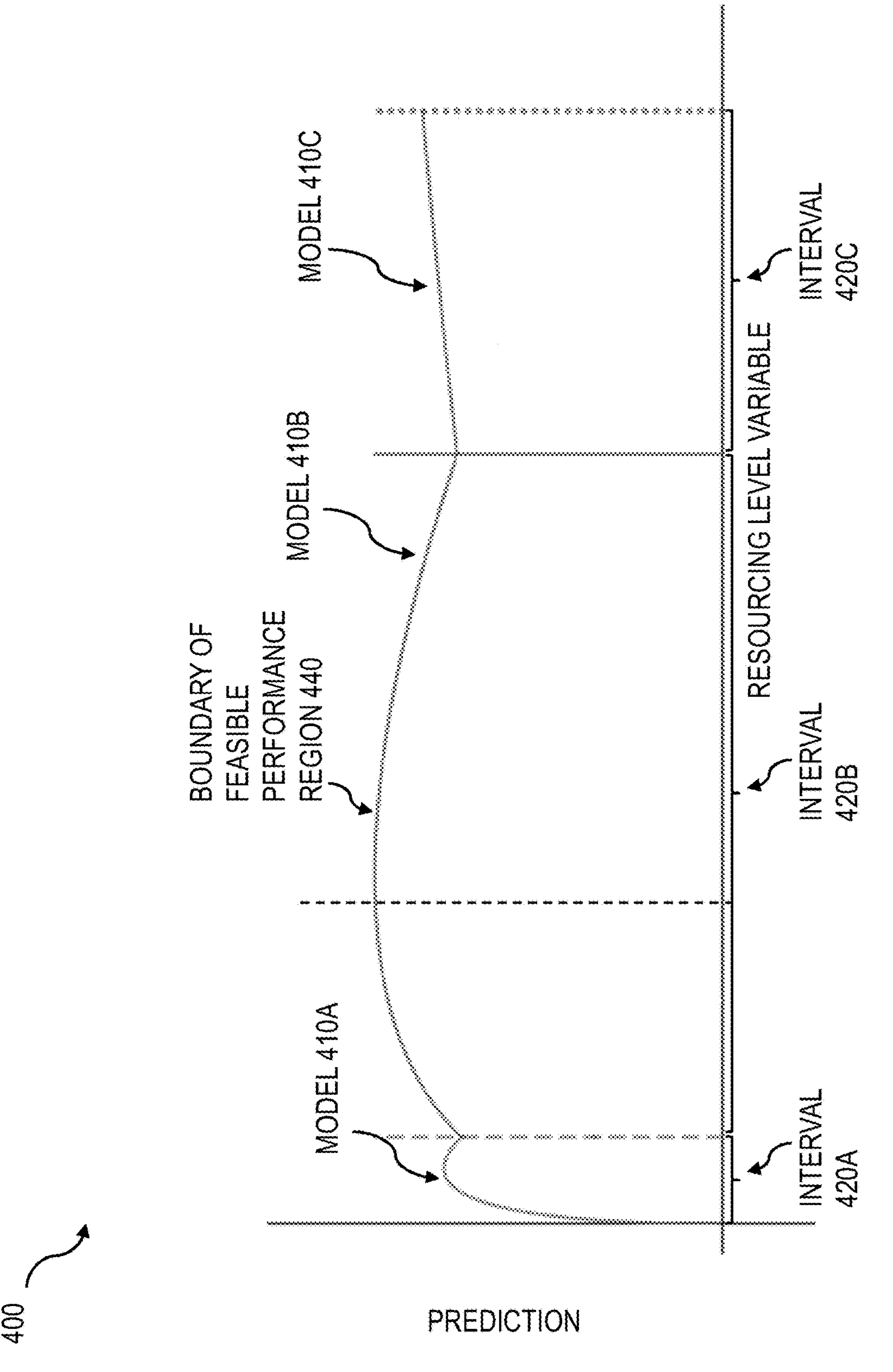
FIG. 4 is a diagram illustrating an example visual representation of a feasible performance region.

The visualization 300 can include, for example, a graph of performance as a function of the resourcing variable. In some cases, performance can include impact. The output of each model can be graphed. FIG. 3 illustrates the output of three models, model 310A, $M_A$, model 310B, $M_B$, and model 310C, $M_c$. As illustrated in FIG. 3, below threshold 320A the performance of model 310A is optimal, between threshold 320A and threshold 320B the performance of model 310B is optimal, and after threshold 320B the performance of model 310C is optimal. The intervals can be defined as $I=\{(a_1, a_2), (a_2, a_3), (a_3, a_4)\}$, where $a_1=0$, $a_2$=threshold 320A, $a_3$=threshold 320B, $a_4$=threshold 320C. Then, the feasible performance region can be Feasible Performance Region$=\{(a_1, a_2)\colon M_A, (a_2, a_3)\colon M_B, (a_3, a_4)\colon M_c\}$ FIG. 4 is a diagram illustrating an example visual representation 400 of a feasible performance region. By training and assessing multiple models under different resourcing levels and providing an intuitive representation of the performance of the models under the different resourcing, the model most appropriate for a given operational constraint, business impact, or strategy can be selected and deployed. As such, the performance of the models can be improved and computational resources, production time, and production costs can be saved.

Visual representation 400 can include, for example, feasible performance region boundary 440. As described above with reference to FIG. 3, the feasible performance region can include, for example, interval 420A $(a_1, a_2)$ of resourcing associated with model 410A $M_A$, interval 420B $(a_2, a_3)$ of resourcing associated with model 410B $M_B$, and interval 420C $(a_3, a_4)$ of resourcing associated with model 410C $M_C$. Feasible performance region boundary 440 can easily represent the performance of a set of models, for example, over the entire domain of possible resource levels. To the user, feasible performance region boundary 440 can represent the performance of the set of models (e.g., $M=\{M_A, M_B, M_C\}$ and/or the like) and the set of models can be treated as a single model. As such, some implementations of the current subject matter can facilitate user interaction with a set of models $M=\{M_1, \ldots, M_k\}$ by treating the set of models as a single model $M^*$ (e.g., an ensemble model and/or the like). For example, with $M=\{M_A, M_B, M_C\}$, the interval $I=\{(a_1, a_2), (a_2, a_3), (a_3, a_4)\}$, and the feasible performance region $\{(a_1, a_2): M_A, (a_2, a_3): M_B, (a_3, a_4): M_C\}$, the single model M* can be defined piecewise such that, $$M^*\left(x_h^{(j)}\right) = \begin{cases} M_A\left(x_h^{(j)}\right), & a_1 \le x_h^{(j)} < a_2 \\ M_B\left(x_h^{(j)}\right), & a_2 \le x_h^{(j)} < a_3 \\ M_C\left(x_h^{(j)}\right), & a_3 \le x_h^{(j)} \le a_4 \end{cases}$$

In some cases, the set of models can be tuned by a custom training and evaluation functions or metrics. For example, given an optimal impact optimization function, adjust the set of models with optimization functions representing, for example, constraint values less than optimal. For example, if the optimal impact can be achieved by doing manual quality inspections on 15% of units produced, the constrained models generated can represent constraints that limit inspections to less that the optimal 15% of the units produced. The range of optimization functions that will represent constrained conditions can be determined a priori, but the exact resourcing optimization point can be nondeterministic prior to model generation. The set of models can be assessed at several values within the constrained range. If the constraint is 8%, the set of models can include a model that can be optimized to run on an interval on either side of the constraint, for example one model may be optimized to 7% and another to 11%. The closest model can be used, or a search function can be executed running an additional set of models with optimization functions between the range of the 7% and 11% models to narrow in on the optimal settings for the 8% constraint.

Given a set of models, the feasible performance region can represent the highest model performance given, for example, any impact or capacity constraint. For example, given input such as cost or prices, regional differences in cost or prices could increase or decrease the optimal capacity (e.g., the constrained variable). In regions associated with a high cost, the optimal impact model can require less resources than in a region associated with a low cost. But, if all regions receive the same level of resources, the region associated with a low cost can be experiencing a constraint while the region associated with the high cost is operating at optimal impact. The feasible performance region can represent the optimal impact for a combination of inputs, such as costs and constraints, and can facilitate identifying, for example, strategic resourcing needs, optimal impact model utilization, and/or the like.

In some implementations, an ensemble model can be created. As described above, the ensemble model can include multiple models (e.g., submodels and/or the like). In some cases, the ensemble model can have better performance for a given goal than any of the submodels individually. For example, the multiple submodels can each be trained with respective constraints on a variable of the dataset, with the respective constraints can be from a set of constraints specifying a condition on the variable. When any of the submodels receive inputs with the value of the variable outside of the codomain of the respective constraints on the variable, the submodel can perform worse than, for example, a submodel trained with the respective constraint corresponding to the value of the variable in the input. The ensemble model can improve by, for example, selecting the submodel trained with the respective constraint corresponding to the value of the variable in the input.

Although a few variations have been described in detail above, other modifications or additions are possible. For example, in some implementations, in order to achieve optimal growth with breakeven impact, one would continue classifying as positive all deals until the sum of expected positive impact and the negative impact deals is 0. Once the global optimum is reached, negative expected value transactions can be pursued until the total impact from the positive expected value deals can be exhausted. In some implementations, the value of the constraints can be modified within an interval of possible values of the constraint. For example, on one end of the interval, the value of the constraint can facilitate positively classifying inputs that with a significantly high accuracy (e.g., over 90%) and on the other end of the interval, the value of the constraint can facilitate positively classifying any input. In some implementations, changing the optimization function may not change the trained model including a set of submodels $M=\{M_1, \ldots, M_k\}$.

The subject matter described herein provides many technical advantages. For example, developing an ensemble model bounded by the feasible performance region can define a continuum along which all optimization function local maxima can be represented. This continuum encompasses the spectrum of variation representative of variations and local maxima that exist in the real world use cases where these models can be deployed. As such, a plethora of optimization functions can utilize different points along the feasible performance region to provide customized predictions to an individual level. For example, a business can have production facilities servicing five separate geographical regions, each facility can have unique production capacity, labor and material costs, each region can have a unique strategy, demand, and pricing. Each combination of business value, strategy, demand, and capacity can represent a unique point along the feasible performance region. By determining the appropriate optimization function for each combination of factors, a single feasible performance region can identify the unique local maximum for each region. Variation can exist at a more granular level. Within a region, production lines can have different costs and capacities, sales people can have different strategies, capacities, and costs. With all local maxima represented on the feasible performance region, unique optimization functions can adjust the model to cater to the business reality at any level of granularity down to an individual level. All else being equal, changes in strategy can also be represented by different optimization functions. A shift in strategy from maximum profitability to maximum growth at break-even profitability can be represented as a change in the optimization function identifying a new local maximum. This means that a single ensemble model trained to define the feasible performance region for the business can be applied, and dynamically adjusted, to the current business reality, at multiple levels of granularity to optimize performance. This can greatly reduce the complexity, time, cost, and data required to generate individualized models. The feasible performance region can be established and optimized with a single model training effort. Specialized expert involvement can be minimized in the training and optimization process, which can greatly reduce development time and costs. Data requirements can also be reduced as the model can be tuned to individualized optimization functions. And all transactions used in training may not have to be specific to the individual. This can provide individualized performance even in situations where the individual does not have sufficient data to train a specific model.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving data characterizing a set of models trained on a dataset using a set of resourcing levels, the set of resourcing levels specifying a condition on outputs of models in the set of models;

receiving data characterizing an optimization function and data indicative of one or more metrics for evaluating at least one of a precision, a recall, and an accuracy for each respective model from the set of models spanning a resourcing level from among the set of resourcing levels;

assessing, using the set of resourcing levels and the data characterizing an optimization function, performance of each model in the set of models in each resourcing level in the set of resourcing levels, wherein the performance comprises a precision, recall and accuracy for each model and the respective resourcing level;

determining, using the assessment, a feasible performance region, the feasible performance region associating each resourcing level in the set of resourcing levels with the model in the set of models assessed to have a highest performance among the set of models;

displaying the feasible performance region in a graphical user interface;

receiving user provided input on the displayed feasible performance region; and generating an ensemble model based on the displayed feasible performance region and the received user provided input across a domain of possible resourcing levels.

2. The method of claim 1, further comprising:

receiving user input specifying the condition on a variable, a value of a positive, a value of a negative, training data, and a training goal;

training, using the training data, the training goal, and the condition on the variable, respective models in the set of models, the respective models in the set of models associated with respective resourcing levels in the set of resourcing levels specifying the condition on the outputs of the models in the set of models; and determining, using the set of models, a set of optimization functions;

wherein each optimization function in the set of optimization functions is associated with respective resourcing levels in the set of resourcing levels specifying the condition on the outputs of the models in the set of models.

3. The method of claim 2, wherein the value of the positive includes a value of true positive and a value of false positive, and wherein the value of negative includes a value of true negative and a value of false negative.

4. The method of claim 1, further comprising:

determining, using the set of resourcing levels specifying the condition on the outputs of the models in the set of models, a set of optimization functions; and generating the set of models using the set of optimization functions.

5. The method of claim 1, wherein the model associated with the respective resourcing level is an optimally performing model for the respective resourcing level with respect to the at least one of precision, recall, accuracy, and the optimization function.

6. The method of claim 1, wherein determining the feasible performance region includes bounding every model in the set of models leading to an optimal point in a range of possible resourcing levels;

wherein the range of possible resourcing levels includes every resourcing level between a first resourcing level and a second resourcing level; and wherein the second resourcing level is different from the first resourcing level.

7. The method of claim 1, wherein determining the feasible performance region further comprises:

interpolating a set of possible resourcing levels between consecutive resourcing levels in the set of resourcing levels;

defining, using the set of possible resourcing levels, at least one of a region and a border;

wherein a respective possible resourcing level in the set of possible resourcing levels is associated with the model in the set of models that is associated with at least one of the consecutive resourcing levels.

8. The method of claim 1, further comprising:

receiving, after displaying the feasible performance region, user input specifying a new resourcing level value;

generating, based on the new resourcing level value, at least one new model; and computing, using the new resourcing level value, a new optimization function value;

wherein the at least one new model is trained using the new optimization function value.

9. A system comprising: at least one data processor; and memory storing instructions which, when executed by the at least one data processor, causes the at least one processor to perform operations comprising:

receiving data characterizing a set of models trained on a dataset using a set of resourcing levels, the set of resourcing levels specifying a condition on outputs of models in the set of models;

receiving data characterizing an optimization function and data indicative of one or more metrics for evaluating at least one of a precision, a recall, and an accuracy for each respective model from the set of models spanning a resourcing level from among the set of resourcing levels;

assessing, using the set of resourcing levels and the data characterizing an optimization function, performance of each model in the set of models in each resourcing level in the set of resourcing levels, wherein the performance comprises a precision, recall, and accuracy for each model and the respective resourcing level;

determining, using the assessment, a feasible performance region, the feasible performance region associating each resourcing level in the set of resourcing levels with the model in the set of models assessed to have a highest performance among the set of models;

displaying the feasible performance region in a graphical user interface;

receiving user provided input on the displayed performance region; and generating an ensemble model based on the displayed feasible performance region and the received user provided input across a domain of possible resourcing levels.

10. The system of claim 9, the operations further comprising:

receiving user input specifying the condition on a variable, a value of a positive, a value of a negative, training data, and a training goal;

training, using the training data, the training goal, and the condition on the variable, respective models in the set of models, the respective models in the set of models associated with respective resourcing levels in the set of resourcing levels specifying the condition on the outputs of the models in the set of models; and determining, using the set of models, a set of optimization functions;

wherein each optimization function in the set of optimization functions is associated with respective resourcing levels in the set of resourcing levels specifying the condition on the outputs of the models in the set of models.

11. The system of claim 10, wherein the value of the positive includes a value of true positive and a value of false positive, and wherein the value of negative includes a value of true negative and a value of false negative.

12. The system of claim 9, the operations further comprising:

determining, using the set of resourcing levels specifying the condition on the outputs of the models in the set of models, a set of optimization functions; and generating the set of models using the set of optimization functions.

13. The system of claim 9, wherein the model associated with the respective resourcing level is an optimally performing model for the respective resourcing level with respect to the at least one of precision, recall, accuracy, and an optimization function.

14. The system of claim 9, wherein determining the feasible performance region includes bounding every model in the set of models leading to an optimal point in a range of possible resourcing levels;

wherein the range of possible resourcing levels includes every resourcing level between a first resourcing level and a second resourcing level; and wherein the second resourcing level is different from the first resourcing level.

15. The system of claim 9, wherein determining the feasible performance region further comprises:

interpolating a set of possible resourcing levels between consecutive resourcing levels in the set of resourcing levels;

defining, using the set of possible resourcing levels, at least one of a region and a border;

wherein a respective possible resourcing level in the set of possible resourcing levels is associated with the model in the set of models that is associated with at least one of the consecutive resourcing levels.

* * * * *